2,918,486
EXTRACTION OF ALCOHOLS WITH PROPYLENE CARBONATE

Robert C. Binning, Texas City, and Joe T. Kelly, Dickinson, Tex., assignors to The American Oil Company, Texas City, Tex., a corporation of Texas No Drawing. Application May 28, 1958
Serial No. 738,292

9 Claims. (Cl. 260—450)

The present invention relates to the extraction of oil-soluble alcohols from normally liquid hydrocarbons, and particularly concerns the use of liquid propylene carbonate as a selective solvent for this purpose.

An object of the present invention is to provide a method for removing dissolved alcohols from mixtures thereof with liquid hydrocarbons. Another object is to provide a method for removing such alcohols from mixtures thereof with liquid hydrocarbons and organic carbonyl compounds. A further object is to provide a method for recovering valuable oil-soluble chemicals from the products of hydrogenation of carbon monoxide in the presence of an iron catalyst. Other objects and advantages of the invention will be apparent from the detailed description thereof.

It has been found that oil-soluble alcohols can be extracted from a mixture of the alcohol with normally liquid hydrocarbons by employing liquid propylene carbonate as the selective solvent. Mixtures such as cannot readily be separated by distillation due to the closeness of the boiling points of the hydrocarbon and alcohol or because of azeotrope formation are readily separated by extraction with this solvent. The process is selective for extracting alcohols in preference to organic carbonyl compounds such as aldehydes and ketones, and improved selectivity can be obtained by scrubbing the extract (either during the extraction process or after separation of an extract phase) with a liquid hydrocarbon. The scrubbing hydrocarbon is one that boils outside the boiling range of the components of the mixture undergoing separation. Enhanced selectivity is obtained in the extraction if the propylene carbonate contains 1 to 10% water. The oil-soluble products obtained from the hydrogenation of carbon monoxide using an iron catalyst can be extracted with the liquid propylene carbonate, after carboxylic acids have been removed from the oil-soluble products, thereby extracting valuable oil-soluble alcohols and simultaneously purifying the hydrocarbons and rendering them more suitable for subsequent processing.

The liquid propylene carbonate can be used in the solvent extraction of mixtures of normally liquid hydrocarbons and oil-soluble alcohols. The extract phase is rich in extracted alcohols and the hydrocarbon raffinate phase is depleted in the alcohols. In this manner oil-soluble alcohols, such as contain from about 2 to 15 carbon atoms per molecule, can be extracted from normally liquid hydrocarbons. The particular type of hydrocarbon present has no critical bearing upon the extraction process, and it may be an aromatic, cycloaliphatic or aliphatic hydrocarbon, e.g. paraffin, olefin, or it may consist of mixtures of various hydrocarbons. The mixture undergoing extraction may consist of a wide boiling range mixture of hydrocarbons and alcohols or a narrow boiling range mixture. The present invention is particularly useful for separating mixtures which cannot ordinarily be separated by distillation due to the closeness of boiling points of the hydrocarbon and alcohol or because azeotropes are formed between the hydrocarbon and alcohol. Those mixtures of hydrocarbons and alcohols which boil below about 200° C. are particularly suitable charge stocks for solvent extraction with the propylene carbonate since the selective solvent can be readily recovered from the extracted components by distillation. The propylene carbonate boils at a temperature higher than 200° C. and the extracted components will be recovered overhead during the distillation.

Chemical manufacturers often have mixtures of oil-soluble alcohols with normally liquid hydrocarbons. Such mixtures are formed during the oxidation of hydrocarbons such as paraffinic and/or olefinic hydrocarbons. They are also formed during the hydrogenation of carbon monoxide by the Fischer-Tropsch process and its various modifications. As an example of this type process, carbon monoxide and hydrogen are contacted with an iron catalyst at a temperature between about 230 to 400° C. and a pressure between about 100 to 700 p.s.i.g. Streams of water-soluble and oil-soluble chemicals are produced. The water-soluble alcohols may readily be recovered from the products by water washing techniques, but the oil-soluble alcohols are difficult to remove from the hydrocarbons which are produced during the process. The oil-soluble organic chemicals, which form a homogeneous solution in the liquid hydrocarbons, consist of carboxylic acids, alcohols, aldehydes and ketones, and a small amount of esters. The composition of such a stream is given in Industrial and Engineering Chemistry, volume 45, pages 359–362 (February 1953). Because of the oxygen-containing hydrocarbons present in the mixture of predominantly $\alpha$-olefin hydrocarbons, these olefins cannot always be converted to other chemicals because of the inhibiting action of the oxygenated hydrocarbons in various chemical reactions. The present invention has a two fold benefit of recovering the oxygenated hydrocarbons for further refining and subsequent sale and also purifies the hydrocarbons so that the olefins therein may be converted more easily to other chemicals. The carboxylic acids may be removed from the hydrocarbon stream containing the oil-soluble chemicals by extracting with aqueous solutions of sodium carbonate, or by other techniques. Thereafter the hydrocarbon stream of oil-soluble chemicals may be extracted with liquid propylene carbonate to remove the alcohols from the hydrocarbons. Either a wide boiling range portion of the oil-soluble chemicals stream may be extracted, or a narrow boiling mixture may be extracted. This solvent is quite selective for extracting the alcohol from the hydrocarbon. It is less selective for extracting aldehydes, ketones, esters, etc. from the hydrocarbons and therefore has ability to cause some separation between the latter compounds and alcohols.

When it is desired to remove the maximum amount of the various oil-soluble oxygenated hydrocarbons present in the hydrocarbon stream containing dissolved alcohols, carbonyl compounds, etc. from the Fischer-Tropsch process or from similar streams from hydrocarbon oxidation processes, the hydrocarbon oil containing the dissolved oil-soluble oxygenated hydrocarbons may be selectively hydrogenated to convert aldehydes and ketones therein to alcohols. Because alcohols are extracted by liquid propylene carbonate with high efficiency, a more complete purification of the hydrocarbons is obtained during the solvent extraction step. This renders the raffinate hydrocarbon phase more suitable for subsequent use or processing such as final deoxygenation and conversion to gasoline constituents. The hydrogenation may be carried out at temperatures of 50 to 150° C. using catalysts such as nickel on kieselguhr or copper chromite and thereby effecting conversion of the carbonyl compound to the alcohol without any substantial conversion of alcohols to hydrocarbons. Methods for effecting selective reduction of a carbonyl group are taught in U.S. 2,760,994 and in the text "Reactions of Hydrogen" by H. Adkins, pages 8, 11, University of Wisconsin Press (1937).

In general, liquid-liquid extraction operations can be carried out with the propylene carbonate at temperatures of from about 0° to 200° C. Even lower and higher temperatures than those indicated may be used. For example, temperatures in the range of 20° to 100° C. may be used. The particular temperature used will depend upon the particular charging stock, the solvent:feed ratio, the number of extraction stages, the degree of extraction which is sought, the proportions of auxiliary solvents or countersolvents, etc.

The ratio of solvent to the charge mixture of hydrocarbons and alcohol undergoing separation, must be sufficient to exceed the solubility of the solvent in the charge stock in order to form two distinct liquid phases, viz. a raffinate phase of hydrocarbons containing little if any solvent, and an extract phase of solvent containing the alcohols as the solute. Generally, between about 0.2 to 10 volumes of solvent may be used per volume of the charge mixture which is to be separated. Equal volumes of solvent and charge mixture constitute a very satisfactory ratio. A small amount of water, e.g. 1 to 10% by weight based on solvent, may be introduced into the extraction zone (either separately or together with the solvent) to increase the selectivity of the solvent after extracting oxygenated hydrocarbons such as alcohols. To increase the selectivity for removing alcohols in preference to hydrocarbons or carbonyl compounds such as aldehydes and ketones, a hydrocarbon countersolvent may be used. This countersolvent is preferably one which boils outside the boiling range of the charge mixture undergoing separation and outside the boiling range of the solvent. In this way it can be fractionated to separate it from the hydrocarbon raffinate phase and the extract phase (when any amounts are left in this latter phase). The countersolvent may be used during the extraction process by introducing it into the extraction zone so that it scrubs the extract phase as it passes through the extraction zone. In this manner it scrubs out the carbonyl compounds and any minor amounts of hydrocarbons which may have been extracted from the charge mixture. Washing with the hydrocarbon countersolvent may also be carried out after the extract phase has been separated from the raffinate phase. In this manner the separated extract phase may be scrubbed in a tower or other suitable equipment to remove the extracted carbonyl compounds and hydrocarbons from the extract phase.

Any of the conventional techniques can be used to recover the solvent from the extracted alcohols, carbonyl compounds, etc. The extract may be distilled to recover the alcohols and/or carbonyl compounds overhead while retaining the solvent as a bottoms. Although a very slight (1-2%) of the solvent decomposes when using high distillation temperatures, this can be substantially eliminated by the use of vacuum distillation at lower temperatures. Other techniques besides distillation may be used to recover the alcohols from the solvent, e.g. washing the extract phase with water to dissolve out the solvent while leaving the alcohols behind, and then recovering the solvent from the water. Likewise, any dissolved solvent can be recovered from the raffinate phase by washing with water. The extraction process can be carried out in a batch, continuous or semi-continuous manner, and in one or more actual or theoretical stages, employing contacting equipment such as has heretofore been employed in the selective solvent refining art.

Surprisingly, propylene carbonate is a much superior solvent for the extraction of oil-soluble alcohols from hydrocarbons than is ethylene carbonate. It is much more selective than is ethylene carbonate, and it also has a greater capacity for the extracted oxygenated hydrocarbons than does ethylene carbonate. This enables more efficient extraction operations, the use of a lesser number of extraction stages, and certain other advantages. While ethylene carbonate is normally a solid at room temperature and introduces complications when using it as a selective solvent, such complications are not existent when propylene carbonate is employed.

Certain solvent extractions were carried out which are illustrative of the present invention. A mixture of hydrocarbons and oil-soluble oxygenated compounds which was prepared by the hydrogenation of carbon monoxide in the presence of an iron catalyst (modified Fischer-Tropsch process) was obtained. The carboxylic acids had been removed from this mixture, and the mixture had been fractionated to obtain $C_6$, $C_7$, and $C_8$ fractions. The $C_6$ fraction boiled between about 20 and 80° C.; the $C_7$ fraction boiled between 80 and 106° C.; and the $C_8$ fraction boiled between about 106° C. and 133° C. Each of these fractions were analyzed by fluorescent indicator analysis and found to have the compositions shown in Table I together with trace amounts of aromatic hydrocarbons. About one-half of the oxygen-containing hydrocarbons were alcohols, aldehydes comprised the next largest portion thereof, and the remainder consisted primarily of ketones with minor amounts of carboxylic acid esters and other oxygenated hydrocarbons. The alcohol in the $C_6$ fraction was primarily ethanol; the alcohols in the $C_7$ fraction were primarily propyl alcohols together with some butyl alcohols; and the alcohols in the $C_8$ fraction were butyl and amyl alcohols. Propylene carbonate saturated with water (7 weight percent water) was agitated at 23° C. with an equal volume of each one of the above defined fractions until equilibrium was established. The extract and raffinate phases were then separated and distilled to recover the extract and raffinate samples free of propylene carbonate. The results obtained are shown in Table I which follows.

*Table I*

CHARGE STOCK

| Fraction of HCS Oil | Composition, Vol. Percent | | |
|---|---|---|---|
| | Oxys [1] | Olefins | Paraffins |
| $C_6$ | 7 | 84 | 7 |
| $C_7$ | 8 | 82 | 10 |
| $C_8$ | 11 | 79 | 10 |

EXTRACTION RESULTS

| Fraction of HCS Oil | Raffinate, Vol. percent of Charge | Oxys [1] Extracted, Vol. Percent | Selectivity [2] of Solvent |
|---|---|---|---|
| $C_6$ | 88 | 87 | 99 |
| $C_7$ | 87 | 78 | 49 |
| $C_8$ | 85 | 85 | 78 |

[1] Oxys are mixtures of alcohols, aldehydes, ketones, esters.
[2] Selectivity = $\beta$ value
= (Conc. of oxys in Extract)/(Conc. of HC in Extract) / (Conc. of oxys in Raff.)/(Conc. HC in Raff.)

It is evident from the extraction results shown above that propylene carbonate is highly selective for extracting the oxygen-containing hydrocarbons from the hydrocarbon oil. Beta values as high as 99 were obtained, note the results obtained on the $C_6$ fraction. The analysis of the raffinate from the extraction of the $C_6$ fraction revealed that it contained only one weight percent of oxygen-containing hydrocarbon. The high yield of raffinate oil also shows that the hydrocarbons can be purified quite readily by extraction with the propylene carbonate solvent. Additional solvent extractions of various HCS fractions were carried out at temperatures ranging up to about 100° C., using from 1 to 5 extraction stages, employing various ratios of solvent to charge oil mixture, and excellent results were obtained.

Thus having described the invention, what is claimed is:

1. A method for refining a mixture comprising normally liquid hydrocarbons and oil-soluble alcohols, which process comprises selectively extracting said mixture with liquid propylene carbonate, and separating a liquid extract phase.

2. The method of claim 1 wherein the hydrocarbon-alcohol solution is not readily separable by distillation.

3. The method of claim 1 wherein propylene carbonate containing from 1 to 10% by weight of water is employed as the selective solvent.

4. The method of claim 1 wherein the mixture which is extracted with said liquid propylene carbonate is produced by hydrogenating carbon monoxide in the presence of an iron catalyst and thereby producing water-soluble oxygenated organic compounds, oil-soluble oxygenated organic compounds and hydrocarbons, recovering a mixture of hydrocarbons containing dissolved oil-soluble organic oxygenated compounds comprised of carboxylic acids, alcohols, aldehydes and ketones, removing carboxylic acids from the mixture of hydrocarbons and dissolved oil-soluble organic oxygenated compounds, and thereafter extracting with liquid propylene carbonate the mixture of hydrocarbons and organic oxygenated compounds from which carboxylic acids had been removed.

5. The method of claim 1 wherein the mixture of hydrocarbons and alcohols also contains aldehydes, ketones, and carboxylic acid esters.

6. The method of claim 1 wherein the mixture of hydrocarbons and alcohols boils below about 200° C.

7. A method for refining a mixture comprising normally liquid hydrocarbons and alcohols and organic carbonyl compounds which process comprises agitating said mixture with an amount of liquid propylene carbonate sufficient to form distinct extract and raffinate phases, washing said extract phase with normally liquid hydrocarbons and thereby scrubbing organic carbonyl compounds from said extract phase, and recovering a scrubbed extract phase of propylene carbonate rich in alcohol.

8. The method of claim 7 wherein the liquid hydrocarbon employed in scrubbing the extract phase boils at a temperature outside the boiling range of the components of the mixture charged to the refining step.

9. The method of claim 7 wherein the liquid propylene carbonate is saturated with water.

References Cited in the file of this patent

UNITED STATES PATENTS

| | | |
|---|---|---|
| 2,580,750 | Fleming | Jan. 1, 1952 |
| 2,688,645 | Badertscher et al. | Sept. 7, 1954 |